US012571311B2

(12) United States Patent
Barua et al.

(10) Patent No.: US 12,571,311 B2
(45) Date of Patent: Mar. 10, 2026

(54) EROSION-SHIELDED TURBINE BLADES AND METHODS OF MANUFACTURING THE SAME

(71) Applicant: GENERAL ELECTRIC COMPANY, Schenectady, NY (US)

(72) Inventors: Ananda Barua, Schenectady, NY (US); Changjie Sun, Clifton Park, NY (US); Christopher Edward Wolfe, Niskayuna, NY (US); John Matthew Sassatelli, Valley Falls, NY (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 17/973,198

(22) Filed: Oct. 25, 2022

(65) Prior Publication Data

US 2024/0133297 A1 Apr. 25, 2024
US 2024/0229648 A9 Jul. 11, 2024

(51) Int. Cl.
F01D 5/00 (2006.01)
B23P 6/00 (2006.01)

(52) U.S. Cl.
CPC .............. F01D 5/005 (2013.01); B23P 6/007 (2013.01); *F05D 2230/10* (2013.01); *F05D 2230/22* (2013.01)

(58) Field of Classification Search
CPC .. F05D 2230/10; F05D 2230/22; F01D 5/005; B23P 6/007
See application file for complete search history.

(56) References Cited

U.S. PATENT DOCUMENTS

| | | |
|---|---|---|
| 4,842,663 A | 6/1989 | Kramer |
| 9,291,062 B2 | 3/2016 | Jones et al. |
| 9,695,697 B2 | 7/2017 | Fandrei, II |

(Continued)

FOREIGN PATENT DOCUMENTS

| | | |
|---|---|---|
| EP | 2781622 A1 | 9/2014 |
| FR | 3102378 A1 | 4/2021 |
| KR | 20040100506 A | 12/2004 |
| TW | 253473 B | 4/2006 |

OTHER PUBLICATIONS

Characterization of Inconel 625 fabricated using powder-bed-based additive manufacturing techniques, by Gonzalez et al., Journal of Material Processing tech., Aug. 2017, pp. 200-210 (Year: 2017).*

(Continued)

*Primary Examiner* — Moshe Wilensky
(74) *Attorney, Agent, or Firm* — Armstrong Teasdale LLP

(57) ABSTRACT

A method of manufacturing an erosion-shielded turbine blade includes providing a turbine blade for use with a rotary machine. The turbine blade includes an airfoil extending between a root and a tip. The airfoil includes a pressure side and an opposite suction side, and each of the pressure and suction sides extends between a leading edge and a trailing edge. The method also includes printing a green body part by an additive manufacturing process by selectively depositing a binder solution across a particulate erosion-resistant material, and sintering the green body part to produce a post-sintering erosion shield that includes densified erosion-resistant material. The method also includes coupling the erosion shield to the leading edge of the turbine blade.

20 Claims, 7 Drawing Sheets

(56) References Cited

U.S. PATENT DOCUMENTS

| 9,776,282 | B2 | 10/2017 | Subramanian et al. | |
| 10,907,483 | B2 | 2/2021 | Okuda et al. | |
| 11,135,677 | B2 | 10/2021 | Mangano et al. | |
| 2010/0322775 | A1 | 12/2010 | Suerken | |
| 2016/0208624 | A1* | 7/2016 | Smith | F01D 5/147 |
| 2018/0045216 | A1 | 2/2018 | Karlen et al. | |
| 2018/0304418 | A1 | 10/2018 | Wiebe et al. | |
| 2019/0136697 | A1* | 5/2019 | Foster | F01D 25/005 |
| 2019/0375008 | A1* | 12/2019 | Barua | B22F 10/43 |
| 2020/0116044 | A1 | 4/2020 | Jain et al. | |
| 2020/0232333 | A1 | 7/2020 | Shuck | |
| 2022/0143922 | A1* | 5/2022 | Barua | B33Y 40/20 |
| 2022/0203448 | A1 | 6/2022 | Kulkarni et al. | |
| 2022/0362856 | A1 | 11/2022 | Suchel et al. | |

OTHER PUBLICATIONS

Microstructural evolution and resulting properties of differently sintered and heat-treated binder-jet 3D-printed Stellite 6, by Mostafaei et al., Materials Science & Engineering C, Apr. 2019, pp. 276-288 (Year: 2019).*

Xu, Guojian et al., Cladding of Stellite-6 and Vanadium Carbide on Carbon Steel Using a Yttrium-Aluminum-Garnet Laser Robot system; Journal of Laser applications 18, 47 (2006); https://doi.org/10.2351/1.1961689; Published Online Mar. 9, 2006.

Lupoi, Rocco et al., "Hardfacing steel with nanostructured coatings of Stellite-6 by supersonic laser deposition" Light: Science & Applications 2012; e10; doi: 10.1038/lsa.2012.10; 6 pp.

* cited by examiner

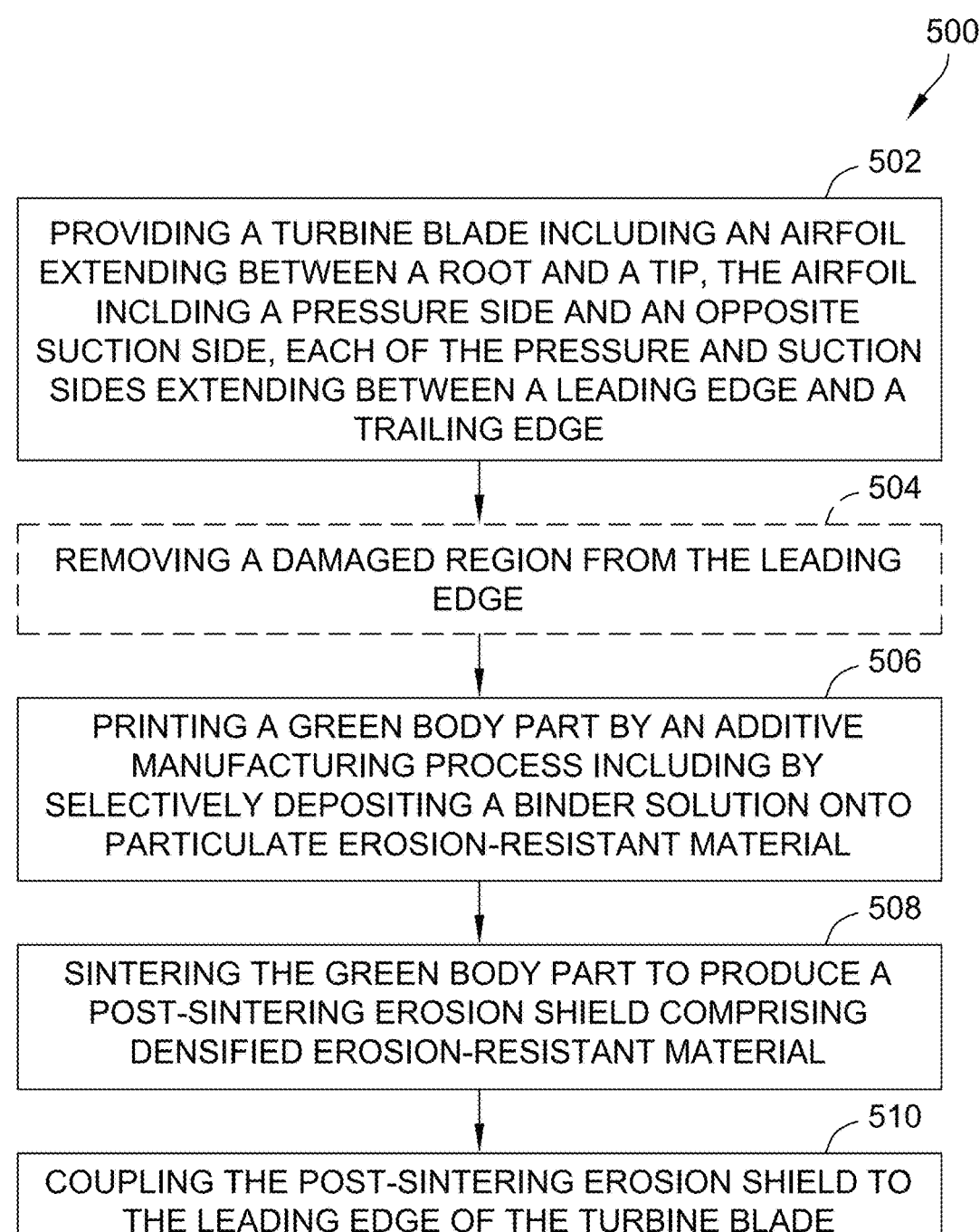

500

502

PROVIDING A TURBINE BLADE INCLUDING AN AIRFOIL EXTENDING BETWEEN A ROOT AND A TIP, THE AIRFOIL INCLDING A PRESSURE SIDE AND AN OPPOSITE SUCTION SIDE, EACH OF THE PRESSURE AND SUCTION SIDES EXTENDING BETWEEN A LEADING EDGE AND A TRAILING EDGE

504

REMOVING A DAMAGED REGION FROM THE LEADING EDGE

506

PRINTING A GREEN BODY PART BY AN ADDITIVE MANUFACTURING PROCESS INCLUDING BY SELECTIVELY DEPOSITING A BINDER SOLUTION ONTO PARTICULATE EROSION-RESISTANT MATERIAL

508

SINTERING THE GREEN BODY PART TO PRODUCE A POST-SINTERING EROSION SHIELD COMPRISING DENSIFIED EROSION-RESISTANT MATERIAL

510

COUPLING THE POST-SINTERING EROSION SHIELD TO THE LEADING EDGE OF THE TURBINE BLADE

FIG. 5

EROSION-SHIELDED TURBINE BLADES AND METHODS OF MANUFACTURING THE SAME

FEDERAL RESEARCH STATEMENT

The subject matter of this disclosure was made with Government support under Contract No. DE-FE0031807, awarded by the Department of Energy (DOE), and the Government has certain rights in the subject matter claimed herein.

BACKGROUND

The field of the disclosure relates generally to rotary machines, and more particularly to blades used with rotary machines including an erosion-shielded leading edge.

At least some known rotary machines include at least one rotor assembly coupled to a rotor shaft. The rotor assembly includes a plurality of circumferentially-spaced blades that extend radially outward towards a stationary casing that defines a portion of a flow path through the rotary machine. A plurality of stationary vanes (or nozzles) are coupled to the casing in a circumferential array such that the stationary vanes extend radially inwardly into the flow path. The stationary vanes and rotating blades are arranged in alternating rows such that a row of vanes and the immediate downstream row of blades form a "stage" of the rotary machine. The vanes direct the flow towards the downstream row of blades wherein the blades extract energy from the flow, thereby developing the power necessary to drive a rotor and/or an attached load, e.g., a generator. For example, but not by way of limitation, the rotor assembly may be part of a steam turbine, or part of a compressor or turbine section of a gas turbine engine.

At least some known steam turbines extract work from a flow of steam to generate power by converting the energy of high-temperature, high-pressure steam generated by a boiler into rotational energy by channeling the steam through various stages of the stationary vanes and rotating blades. Generally, a steam turbine may include a high pressure section, an intermediate pressure section, and a low pressure section. The sections may be arranged in a serial-flow orientation wherein each section includes any number of stages that each include a row of vanes and a downstream row of blades. Each turbine stage is designed to extract useful work from the steam channeled through the flow path. Steam flowing through the flow path causes the blades to rotatably drive the rotor, thereby extracting work from the steam. The steam gradually expands and the temperature and pressure of the steam may gradually decrease. Between the various turbine sections, the steam may be reheated for performing work in the next section prior to the steam being exhausted from the turbine exhaust. Higher temperature steam turbines may generate increased output as the increased temperature of the steam increases the overall energy available for extraction.

As the pressure and temperature change, the steam may become wet and moisture contained in the steam may condense into fine water droplets on turbine surfaces, including the nozzles. Moisture contained in the steam is mainly deposited on concave surfaces of the nozzles in the form of films of water. The water films extend across the surface of the nozzles and flow towards the trailing edge of each nozzle while increasing in thickness. The water films are released from the trailing edges of the nozzles as water droplets. If the water films are thick, large and coarse water droplets are released that are scattered by the steam flow and collide with the blades downstream from the nozzles. The collisions damp the torque of the blades through high speed impacts and thus decrease the total performance of the turbine. The coarse water droplets may also cause erosion of surfaces of the blades, which decreases the aerodynamic performance and section thickness of the blades and thus shortens their useful lifespan.

In a steam turbine, late stage moisture in the form of water droplets may cause significant erosion in late stage turbine blades. Generally, as the size of the water droplets increases, the amount of erosion caused by the water droplets increases. Late stage blades include a leading edge that during operation, forms an impact region of the blade with the flow path. An operational life cycle of such blades may be shortened at least in part by damage or deterioration to the blade at the leading edge resulting from the mechanical and/or thermal stresses induced during turbine operation.

To facilitate reducing the effects of such stresses, at least some blades may include a shield extending across a leading edge of the blade. The shield may be formed from an erosion-resistant material that is different from the base material of the blade, such as a cobalt-chromium alloy (such as those marketed under the trademark Stellite® by Kennametal Inc., Latrobe, Pa.). Conventional methods typically produce erosion shields via manufacturing techniques such as casting or forging. However, erosion shields produced by these techniques may be prone to cracking during manufacturing or subsequent heat treatments after being coupled to the blade. Existing manufacturing techniques for the erosion shields are also time-consuming.

During maintenance, repair and overhaul (MRO), the erosion-shielded blade may need to be repaired, if the erosion shield has eroded beyond an acceptable threshold. To repair the erosion-shielded blade, the existing erosion shield is typically removed from the blade with machining, and new erosion shield parts are welded onto the blade. Repair processes for the erosion-shielded blades may be time-consuming and take up to 6 months to complete, depending on the availability of erosion shield parts. An MRO event may last for a 2-week span, which is not enough time to manufacture and replace the erosion shields for all the erosion-shielded blades. As a result, an inventory of erosion shield parts are typically maintained in storage. Conventional methods are expensive, both in terms of labor and manufacturing costs, as well as inventory costs for storing spare erosion shields, and time consuming, and would benefit from a process that facilitates manufacturing the erosion shields cost and time efficiently, and on-demand during the start of an MRO event.

Accordingly, there is a need for blades having erosion-shielded leading edges, and methods of manufacturing blades having erosion-shielded leading edges, that address the above-described problems.

BRIEF DESCRIPTION

In one aspect, a method of forming an erosion shield for use with a turbine blade includes providing a turbine blade for use with a rotary machine. The turbine blade includes an airfoil extending between a root and a tip. The airfoil includes a pressure side and an opposite suction side, and each of the pressure and suction sides extends between a leading edge and a trailing edge. The method also includes printing a green body part by an additive manufacturing process by selectively depositing a binder solution across a particulate erosion-resistant material, and sintering the green body part to produce a post-sintering erosion shield that includes densified erosion-resistant material. The method also includes coupling the erosion shield to the leading edge of the turbine blade.

In another aspect, a method of reconditioning an erosion-shielded turbine blade includes providing a turbine blade for use with a rotary machine. The turbine blade includes an airfoil extending between a root and a tip. The airfoil includes a pressure side and an opposite suction side, each of the pressure and suction sides extending between a leading edge and a trailing edge, and a damaged region along the leading edge. The method also includes removing the damaged region from the leading edge. The method also includes printing a green body part by an additive manufacturing process by selectively depositing a binder solution across a particulate erosion-resistant material, sintering the green body part to produce a post-sintering erosion shield that includes densified erosion-resistant material. The method also includes coupling the post-sintering erosion shield to the leading edge of the turbine blade after removing the damaged region.

In another aspect, a method of manufacturing an erosion-shielded turbine blade includes providing a turbine blade for use with a rotary machine. The turbine blade includes an airfoil extending between a root and a tip, and a tip shroud fixedly coupled to the tip. The airfoil includes a pressure side and an opposite suction side, and each of the pressure and suction sides extend between a leading edge and a trailing edge. The method also includes printing a green body part by an additive manufacturing process by selectively depositing a binder solution across a particulate erosion-resistant material, and sintering the green body part to produce a post-sintering erosion shield that includes densified erosion-resistant material. The method also includes coupling the erosion shield to the leading edge of the turbine blade and to an end of the tip shroud proximate to the leading edge such that the erosion shield extends substantially across the end of the tip shroud.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 is an exemplary process flow that may be implemented for forming the blade shown in FIG. 3 using the additive manufacturing system of FIG. 4;

Figure 1:
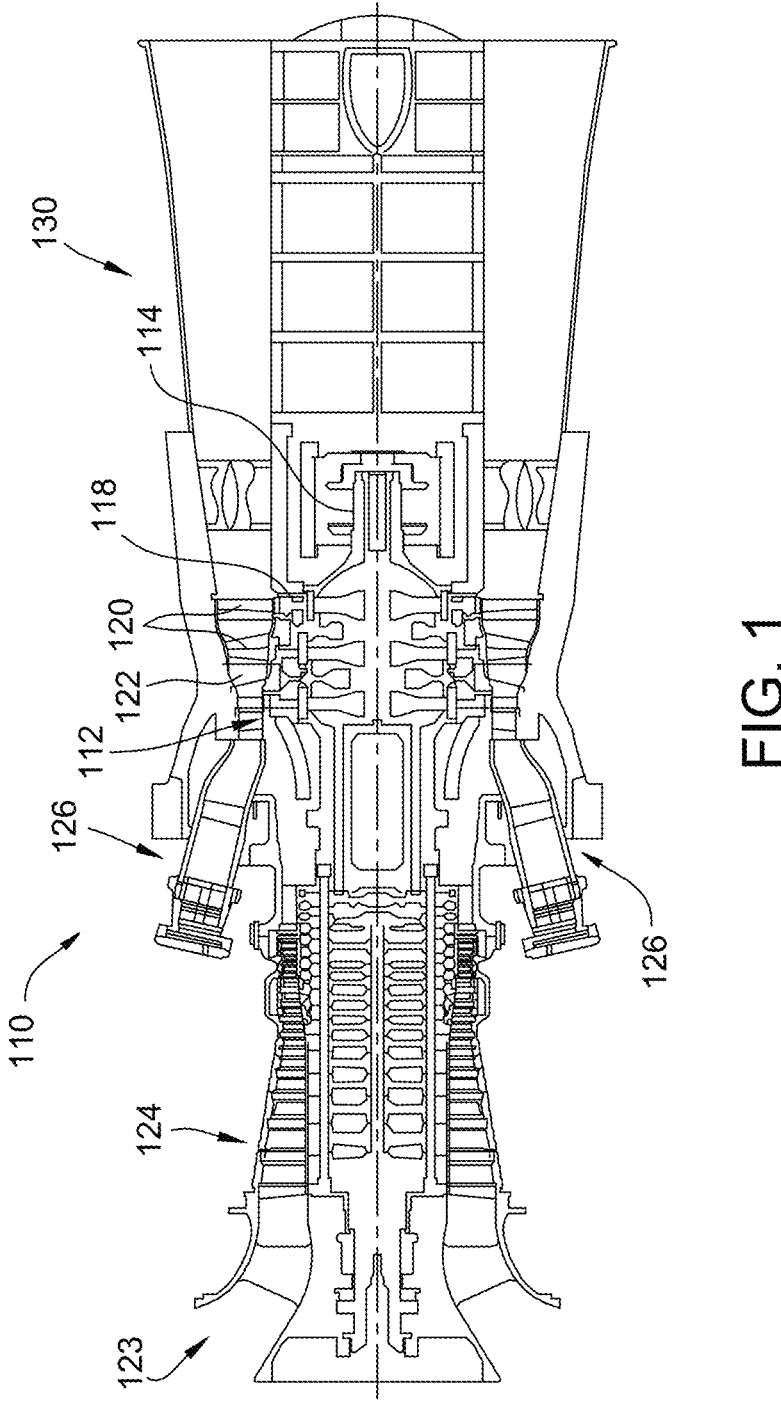
FIG. 1 is a schematic view of an exemplary rotary machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The embodiments described herein overcome at least some of the disadvantages of known erosion-shielded rotary components and known methods of manufacturing and reconditioning erosion-shielded rotary components. The embodiments include an erosion-shielded rotary component that includes a pre-formed erosion shield extending across a leading edge of the rotary component. In some embodiments, the rotary component is a blade used in a rotary machine, such as a steam turbine or a gas turbine, for example. The pre-formed erosion shield is printed using an additive manufacturing process. The additive manufacturing process leverages the current manufacturing and repair techniques for erosion shield, and facilitates reducing lead times for erosion-shielded rotary components (e.g., a turbine blade) from an upper bound of six months down to two weeks, for example. Additionally, the cost of inventory is minimized, since the additive manufacturing processes used to produce the erosion shields facilitate reducing or eliminating the need to stockpile erosion shields as the additive manufactured erosion shields can be produced more cost-effectively, more time-efficient, on-demand, and quickly to meet demand for erosion shields during an MRO event, for example.

The additive manufacturing modality used to produce the erosion shields described herein is binder jet additive manufacturing (BJAM). BJAM yields at least two primary benefits in comparison to a cladding process used to build the erosion shield and other additive manufacturing techniques. First, erosion shields produced by BJAM are characterized by an equiaxed grain structure which means properties are uniform in all directions. Second, erosion shields produced by BJAM are characterized in that little to no residual stresses are induced in the part during manufacturing which means the risk of having internal stress-induced cracks is virtually negligible. Erosion shields are conventionally produced from erosion-resistant material (e.g., cobalt-chromium alloy, such as STELLITE® 6). The erosion-resistant material is particularly susceptible to cracking during manufacturing, and BJAM processes facilitate reducing or eliminating the risk of generating cracks in erosion shields formed from this material. Dimensional analysis performed on printed and sintered parts from this erosion-resistant material confirms that the erosion shields may be produced within tolerance levels and with a desired relative density and homogenous low porosity distribution, among other advantageous properties.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a rotary machine, and the term "downstream" refers to an downstream or exhaust end of the rotary machine.

As used herein, the terms "additive manufacturing" or "additive manufacturing techniques or processes" refer to manufacturing processes in which successive layers of material are deposited on top of each other to build-up, layer-by-layer, a three-dimensional component. The successive layers are then partially melted or fused together to form a monolithic or integral component.

As used herein, the terms "binder jetting" or "binder jet additive manufacturing" refer to an additive manufacturing technique that uses a binder (e.g., glue) to join particles of a powder to form a three-dimensional object. In particular, the binder is selectively deposited (or jetted) onto successive layers of the powder in a build volume, where layers of the powder and the binder adhere to one another to form a three-dimensional object. The powder may be particulate of materials such as, for example, polymers, metals, metal alloys, ceramics, or the like. The binder-printed part may be referred to as a "green body part," which may be subjected to subsequent thermal processing to provide a densified final part. For example, the green body part may be inserted in a sintering furnace that heats the green body part to elevated temperatures (e.g., greater than or equal to about 500° C.) to remove the binder and solidify the powder particles to one another.

As used herein, the phrase "green body part" refers to a binder-printed part or workpiece that has not undergone heat treatment to remove a binder. Green body parts may include particulate material that has not been consolidated through heating to a sintering temperature of the particulate material. Green body parts consolidate during sintering when heated to a sufficient temperature to form densified, post-sintering parts that have strong mechanical properties. As such, green body parts may have relatively lower solid density greater porosities (e.g., greater than or equal to 50% and less than or equal to 70%)) than post-sintering parts (e.g., greater than or equal to 92%, or even greater than or equal to 98%).

The term "sintering," as used herein, refers to heating a green body part to one or more elevated temperatures. Sintering of the green body part may occur in one or multiple stages. For example, in embodiments, sintering may include heating the green body part to at least a first elevated temperature to induce thermal decomposition of at least a portion of a binder used to print the green body part. The green body part may then be heated above a second elevated temperature that is greater than the first elevated temperature to consolidate powder particles to form a post-sintering, consolidated part.

FIG. 1 is a schematic view of an exemplary rotary machine 110. In the exemplary embodiment, rotary machine 110 is a gas turbine engine. Alternatively, rotary machine 110 may be any other turbine engine and/or rotary machine, including, without limitation, a steam turbine engine, a gas turbofan aircraft engine, other aircraft engine, a wind turbine, a compressor, and/or a pump. In the exemplary embodiment, gas turbine 110 includes a rotor assembly 112 that includes a shaft 114 and a plurality of axially-spaced rotor wheels 118.

A plurality of rotating blades or blades 120 are coupled to each rotor wheel 118 such that each blade 120 extends radially outward from each respective rotor wheel 118. More specifically, blades 120 are arranged in rows that extend circumferentially about each wheel 118. A plurality of stationary vanes 122 extend circumferentially around shaft 114 such that each row of stationary vanes 122 is between a pair of axially-adjacent rows of blades 120. For example, turbine 110 includes a plurality of stages that include a row of stationary vanes 122 and a row of rotating blades 120 extending from rotor wheel 118.

A compressor 124 is coupled downstream from an intake section 123, and a plurality of combustors 126 are coupled circumferentially about rotor assembly 112 such that each combustor 126 is in flow communication with compressor 124. An exhaust section 130 is coupled downstream from turbine 110. Turbine 110 is rotatably coupled to compressor 124 via shaft 114.

During operation, air at atmospheric pressure is compressed by compressor 124 and is delivered downstream to combustors 126. The air exiting the compressor is heated by adding fuel to the air and burning the resulting air/fuel mixture. The gas flow resulting from combustion of fuel in the combustion stage then expands through the turbine 110, delivering some of its energy to drive the turbine 110 and a load, such as an electrical generator.

To produce the required driving torque, turbine 110 consists of one or more stages. Each stage includes a row of the stationary vanes 122 and a row of the rotating blades 120 mounted on the rotor wheel 118. The stationary vanes 122 direct the incoming gas from the combustion stage onto the rotating blades 120 to thereby drive the rotor wheel(s) 118, and rotor shaft 114.

Figure 2:
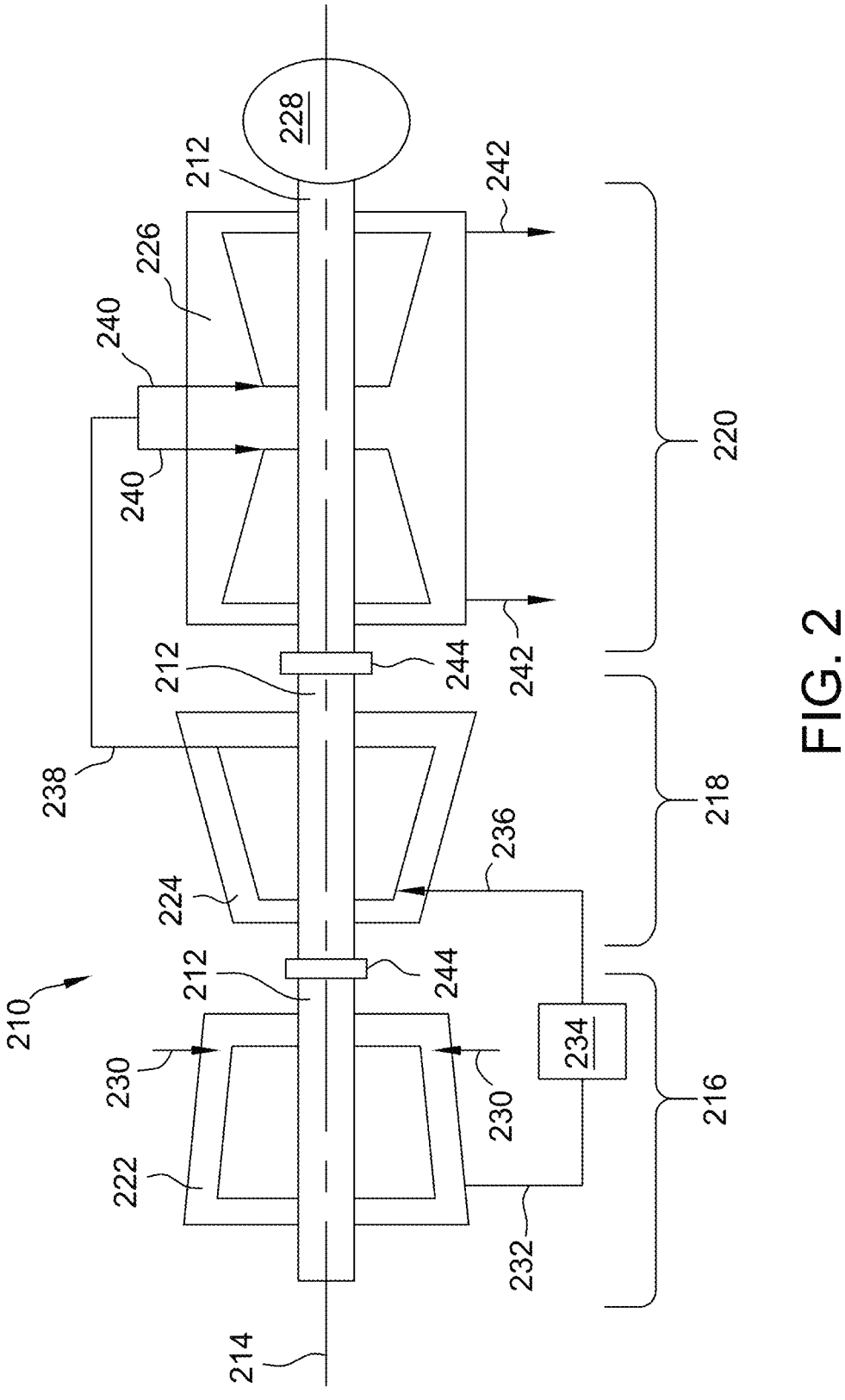
FIG. 2 is a schematic view of another exemplary rotary machine.

FIG. 2 is a schematic view of another exemplary rotary machine 210. In the exemplary embodiment, rotary machine 210 is a steam turbine engine. The steam turbine engine 210 includes a turbine rotor 212 that is mounted rotatably about an axis of rotation 214. The steam turbine engine 210 includes a high pressure (HP) section 216, an intermediate pressure (IP) section 218, and a low pressure (LP) section 220, each mounted on the rotor 212. While FIG. 2 shows one exemplary arrangement of the HP section 216, the IP section 218, and the LP section 220, any suitable arrangement of the HP section 216, the IP section 218, and/or the LP section 220 may be utilized. Each of the HP section 216, the IP section 218, and the LP section 220 includes blades or blades (e.g., blade 300 shown in FIG. 3) that are circumferentially mounted on the rotor 212 in HP, IP, and LP casings 222, 224, 226 in each of the HP section 216, the IP section 218, and the LP section 220, respectively. The blades are driven by steam fed to the respective section, wherein the rotation of the blades resulting from the steam generates mechanical work. The mechanical work produced in the turbine 210 drives an external load 228, such as an electrical generator, via the rotor 212.

As shown in FIG. 2, high pressure steam is supplied via high pressure steam inlets 230. The steam is exhausted from the HP section 216 at a high pressure steam outlet 232 and routed to a reheater 234, in which additional heat is added to the steam. From the reheater 234, the steam is channeled to the IP section 218 via an intermediate pressure steam inlet 236. The steam is exhausted from the IP section 218 at an intermediate pressure steam outlet 238 and routed to the LP section 220 via a low pressure steam inlet 240. The steam is then exhausted from the LP section 220 via low pressure outlets 242.

Each of the HP section 216, the IP section 218, and the LP section 220 are connected along the rotor 212 via couplings 244. The couplings 244 may be mechanical couplings, such as bolted joints, or may be welded joints. In one embodiment, the couplings 244 enable any of the HP section 216, the IP section 218, and/or the LP section 220 to be selectively uncoupled for reconfiguration, service, or maintenance.

Figure 3:
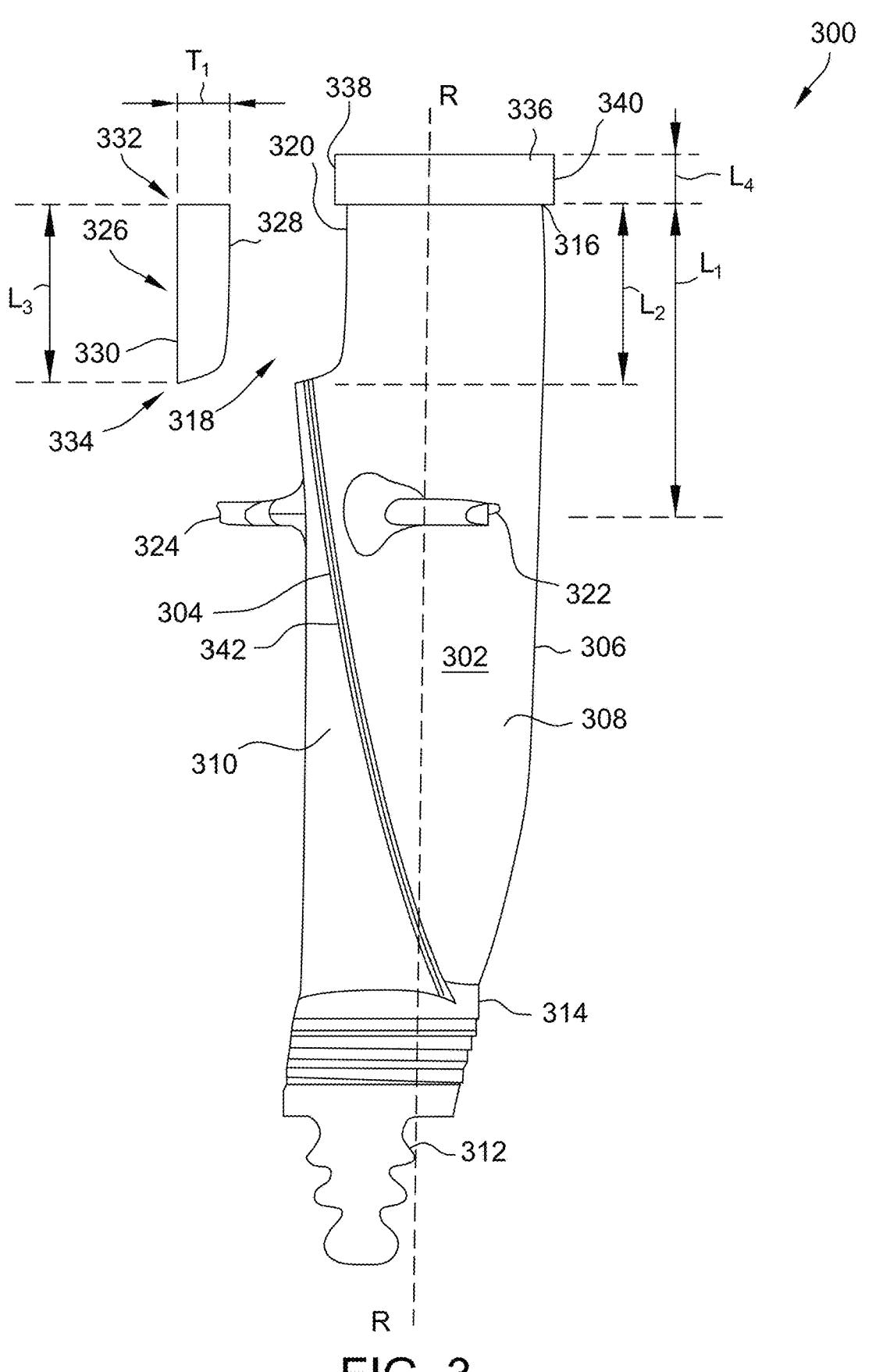
FIG. 3 is a front view of an exemplary blade that may be used with either of the rotary machines shown in FIGS. 1 and 2.

FIG. 3 is a front view of an exemplary blade 300 that may be used with rotary machine 110 (shown in FIG. 1) and/or rotary machine 210 (shown in FIG. 2). Additionally or alternatively, blade 300 may be used with other electric turbomachines including, but not limited to, gas turbofan aircraft engines, other aircraft engines, wind turbines, compressors, fans, and/or pumps. In the exemplary embodiment, blades 300 in each circumferential row at each stage of the rotary machine 110 and/or rotary machine 210 are identical. In alternative embodiments, at least one blade 300 in each row may be different from the remaining blades in that row.

Blade 300 includes an airfoil portion or airfoil 302 that includes a leading edge 304 and an opposite trailing edge 306. A pressure sidewall 308 and a suction sidewall 310 each extend from the leading edge 304 to the trailing edge 306. The blade 300 also includes a root 312 that enables the blade 300 to be installed in a rotary machine, for example, the rotary machine 110 (shown in FIG. 1) and/or the rotary machine 210 (shown in FIG. 2). The root 312, for example, enables the blade 300 to be coupled to the turbine rotor wheel 118 of the rotary machine 110. In the exemplary embodiment, the root 312 is in the form of a dovetail 312. The airfoil 302 and the root 312 are separated by a platform 314 which may include "angel-wing" seals (not shown).

The airfoil 302 extends between the platform 314 and a distal tip 316 along a radial axis R. The pressure sidewall 308 is a generally concave surface, relative to the radial axis R, and the suction sidewall 310 is a generally convex surface, relative to the radial axis R. As a result, the airfoil 302 has an arcuate contour about the radial axis R. A curvature of the pressure and suction sidewalls 308, 310 that defines the arcuate contour of the airfoil 302 may vary depending on the particular turbine and stage in which the airfoil 302 is intended for use. The present disclosure is not limited to any particular geometry of the airfoil 302, and the embodiments disclosed herein are suitable for use with airfoils 302 of various geometries. In particular, as shown in FIG. 3, the shape of the leading edge 304 depends on the arcuate contour of the airfoil 302, and the embodiments disclosed herein are suitable for use with, and accommodate, a myriad of variations of the shape of the leading edge 304.

In the exemplary embodiment, the airfoil 302 includes a recessed area 318 formed in the leading edge 304 near the tip 316. The leading edge 304 includes a recessed surface 320 that extends a radial length $L_1$ within the recessed area 318, and measured along the radial axis R from the tip 316. The radial length $L_1$ of the recessed area 318 is shorter than a total radial length of the airfoil 302 measured along the radial axis R between the platform 314 and the tip 316 such that a portion 342 of the leading edge 304 extends between the recessed area 318 and the platform 314. In some embodiments, the recessed area 318 is formed in the leading edge 304 by removing a damaged portion of the leading edge 304 after the blade 300 has been used in operation. Forming the recessed area 318 may enable the blade 300 to be retrofitted with an erosion shield 326, described in more detail herein.

In the exemplary embodiment, the airfoil 302 also includes a pair of part-span shrouds 322 and 324 that facilitate tuning and/or damping vibrational characteristics of the airfoil 302 during operation. The part-span shrouds 322 each extend outward in a mirrored relationship away from the airfoil 302. More specially, shroud 322 extends outwardly from the airfoil pressure sidewall 308, and shroud 324 extends outwardly from the airfoil suction sidewall 310. In the exemplary embodiment, the part-span shrouds 322 and 324 each extend outwardly from a respective sidewall 308 and 310 at the same radial span, i.e., located a radial length $L_2$ from the tip 316 of the airfoil 302 along the radial axis R. The radial length $L_1$ is shorter than the radial length $L_2$, such that the shrouds 322 and 324 are each radially inward from the recessed area 318. Alternatively, the radial length $L_1$ may be longer than or approximately equal to the radial length $L_2$. The part-span shrouds 322 and 324 of the blades 300 in each circumferential row of the rotary machine 110 and/or rotary machine 210 may be substantially circumferentially-aligned such that each of the shrouds 322 and 324 extends outwardly from the respective airfoil 302 at the same radial span location. Alternatively, the shrouds 322 and 324 may extend outwardly from the respective airfoil 302 at different radial span locations. The part-span shrouds 322 and 324 may have the same size and shape, with each extending approximately the same axial distance from the respective sidewall 308 and 310 or, alternatively, the shrouds 322 and 324 may shaped and/or sized differently from each other.

Each blade 300 also includes a tip shroud 336 fixedly coupled to, or formed integrally with, the airfoil 302 at the distal tip 316. The tip shroud 336 generally defines the radially outermost portion of the blade 300 and provides a surface area that extends substantially perpendicularly to the airfoil 302 such that it caps or covers the tip 316 of the airfoil 302. During operation, the tip shroud 336 engages at opposite ends (i.e., a first end 338 and an opposite second end 340) the two circumferentially-adjacent tip shrouds 336 of the circumferentially-adjacent blades 300 such that a generally annular ring or shroud circumscribing the hot gas path at the location of the stage of blades 300 is formed. This "annular ring" retains the expanding gases of the hot path on the airfoil 302 (i.e., it does not allow the gases to flow past the end of the airfoil blades) to facilitate increasing an amount of energy from the working fluid that may be converted into mechanical energy by the turbine blades. The tip shroud 336, via contact with a tip shroud 336 of an adjacent turbine blade 300, may also "fix" the turbine blade 300 to facilitate reducing vibration of each turbine blade 300. Each tip shroud 336 extends a radial length $L_4$ and may include a sealing rail (not shown) extending between the first end 338 and the second end 340 of the tip shroud 336. Some embodiments of the blade 300 may include two more sealing rails or may not include any sealing rails. As understood in the art, in some embodiments, for example where the blade 300 is used with the gas turbine engine 110, the sealing rail may have any of a variety of cooling passages (not shown) extending therethrough to facilitate cooling the tip shroud 336.

Each blade 300 also includes an erosion shield 326 extending across the leading edge 304 of the airfoil 302. Suitably, the erosion shield 326 is formed using binder jet additive manufacturing (BJAM), described in more detail below with references to FIGS. 4 and 5. In the exemplary embodiment, the erosion shield 326 extends a length $L_3$ between a base end 332 and a nose 334, and includes an inner surface 328 and an outer surface 330. The inner surface 328 extends across the leading edge 304 and is coupled to the leading edge 304, and the outer surface 330 forms an externally-oriented surface of the airfoil 302.

In the exemplary embodiment, the erosion shield 326 is received within the recessed area 318 of the leading edge 304 and the inner surface 328 is coupled to the recessed surface 320. Moreover, the erosion shield 326 is sized and shaped to substantially correspond to a size and shape of the recessed area 318. The outer surface 330 of the erosion shield 326 substantially matches or complements a contour of the portion 342 of the leading edge 304 such that a smooth transition is formed therebetween. It is contemplated that the outer surface 330 may include additional features to enable the erosion shield 326 to function as described herein. The inner surface 328 is sized and shaped to substantially match or complement a three-dimensional geometry of the recessed surface 320.

When the inner surface 328 is coupled to the recessed surface 320, the nose 334 of the erosion shield 326 is adjacent to an intersection defined between the recessed surface 320 and the portion 342 of the leading edge 304 between the recessed area 318 and the platform 314. The length $L_3$ of the erosion shield 326 between the base end 332 and the nose 334 may be approximately equal to the radial length $L_1$ of the recessed area 318, such that the base end 332 is adjacent to, and is substantially flush with, the tip 316 of the airfoil 302. Alternatively, the length $L_3$ of the erosion shield 326 may be such that the base end 332 extends beyond the tip 316 of the airfoil 302 and the erosion shield 326 partially covers the first end 338 of the tip shroud 336. The tip shroud 336, which may be formed from a similar base material as the airfoil 302, may be susceptible to erosion during operation at the first end 338. In embodiments wherein the erosion shield 326 only partially covers, or does not cover at all, the first end 338 of the tip shroud 336, a separate erosion-resistant component may be coupled (e.g., welded) to the first end 338 of the tip shroud 336 and to the base end 332 of the erosion shield 326. Such a separate erosion-resistant component may project beyond the outer surface 330 of the erosion shield adjacent the base end 332 and contact the second end 340 of the tip shroud 336 of an adjacent blade 300. Alternatively, the erosion shield 326 may extend a length $L_3$ beyond the tip 316 such that the erosion shield 326 substantially covers the first end 338 of the tip shroud 336, as well as the recessed area 318, and the inner surface 328 adjacent to the base end 332 is coupled (e.g., welded) to the first end 338 of the tip shroud 336. In these embodiments, fabricating the erosion shield 326 as a one-piece component that covers the recessed area 318 and the first end 338 of the tip shroud 336 may facilitate reducing the assembly (e.g., welding) process time as compared to embodiments where a separate erosion-resistant component is attached to cover the first end 338 of the tip shroud 336. Additionally, in these embodiments, the length $L_3$ of the erosion shield 326 between the base end 332 and the nose 334 may be approximately equal to the combined total of the radial length $L_1$ of the recessed area 318 and the radial length $L_4$ of the tip shroud 336. As will be appreciated, the inner surface 328 of the erosion shield 326 may be sized and shaped to complement or substantially match the three-dimensional geometry of the recessed surface 320 of the leading edge 304 as well as the three-dimensional geometry of the first end 338 of the tip shroud 336, wherein the inner surface 328 is suitably sized and shaped at the areas where it is coupled (e.g., welded) to the recessed surface 320 and the first end 338. The outer surface 330 of the erosion shield 326 proximate to the base end 332 may include a projection (not shown) when the erosion shield 326 substantially covers the tip shroud 336, and the projection of the outer surface 330 may contact the circumferentially-adjacent second end 340 of the tip shroud 336 of an adjacent blade 300.

The erosion shield 326 is suitably formed of an erosion-resistant material selected to facilitate reducing or eliminating erosion of the leading edge 304 of the airfoil 302 across those portions which the erosion shield 326 extends (and, in some embodiments, the first end 338 of the tip shroud 336). Suitably, the erosion shield 326 extends across the leading edge 304 and, optionally, the first end 338 of the tip shroud 336 that is located proximate to the leading edge 304, such that during operation of the rotary machine, the outer surface 330 forms an impact region. Suitable erosion-resistant materials include, but are not limited to only including, cobalt-based alloys, chromium-based alloys, tungsten-based alloy, chromium carbide materials, and/or combinations thereof. In some embodiments, the erosion-resistant material is a cobalt-chromium alloy, such as one of the STELLITE® family of cobalt-chromium alloys, including STELLITE® 6, available from Deloro Wear Solutions GmbH, Koblenz, Germany.

The erosion shield 326 has any suitable thickness $T_1$ that enables the erosion shield 326 to function as described herein. In one embodiment, the thickness $T_1$ of the erosion shield 326 is selected to facilitate providing a sufficient wear resistance and/or erosion-resistance, for example, over a predetermined life of the blade 300. In various embodiments, depending on the application of the blade 300, a suitable thickness $T_1$ of the erosion shield 326 is between about 5 mm to about 500 mm, between about 5 mm to about 100 mm, between about 10 mm to about 50 mm, between about 100 mm to about 500 mm, between about 200 mm to about 400 mm, between about 100 mm to about 200 mm, up to about 5 mm, up to about 10 mm, up to about 100 mm, up to about 500 mm, greater than about 5 mm, greater than about 10 mm, greater than about 100 mm, approximately 5 mm, approximately 10 mm, approximately 100 mm, approximately 500 mm, or any suitable combination, sub-combination, range, or sub-range thereof. Additionally, in some embodiments, based on the shape of the recessed area 318, the thickness $T_1$ of the erosion shield may vary along the length $L_3$ of the erosion shield 326. For example, as shown in FIG. 3, the thickness $T_1$ tapers as the erosion shield 326 extends from the base end 332 towards the nose 334, such that the thickness $T_1$ is greatest adjacent the base end 332.

The material used to couple (e.g., weld) the inner surface 328 to the leading edge 304 (and, optionally, to the first end 338 of the tip shroud 336 proximate to the leading edge 304) is a filler material that is selected to facilitate enhancing the coupling process of the inner surface 328 to the leading edge 304. In some embodiments, the filler material is a material that enables the inner surface 328 to be coupled by welding, such as, for example, via laser welding, gas metal arc welding (or metal inert gas welding), electron beam welding, or gas tungsten arc welding. The filler material is also suitably a material capable of withstanding thermal conditions to which it may be exposed within the turbine during operation. The filler material may confer any additional desired properties. For example, in some embodiments, the filler material is selected to facilitate reducing or eliminating delamination, fatigue, welding difficulties, crack propagation, and/or other undesirable effects. For example, in some embodiments, the filler material provides a barrier that facilitates limiting carbon migration between the airfoil 302 and higher carbon material that may be present in the erosion shield 326, thereby reducing or eliminating weakening of a weld or heat affected zone. Suitable filler materials may include, for example, but are not limited to only including, nickel-based materials and iron-based materials. In one exemplary embodiment, the filler material is a nickel-chromium alloy material, such as, for example, an INCONEL® nickel-chromium superalloy material including INC- ONEL® Alloy 600, INCONEL® Alloy 617, and INCONEL® Alloy 625, available from Special Metals Corporation, Huntington, W. Va.

Figure 4:
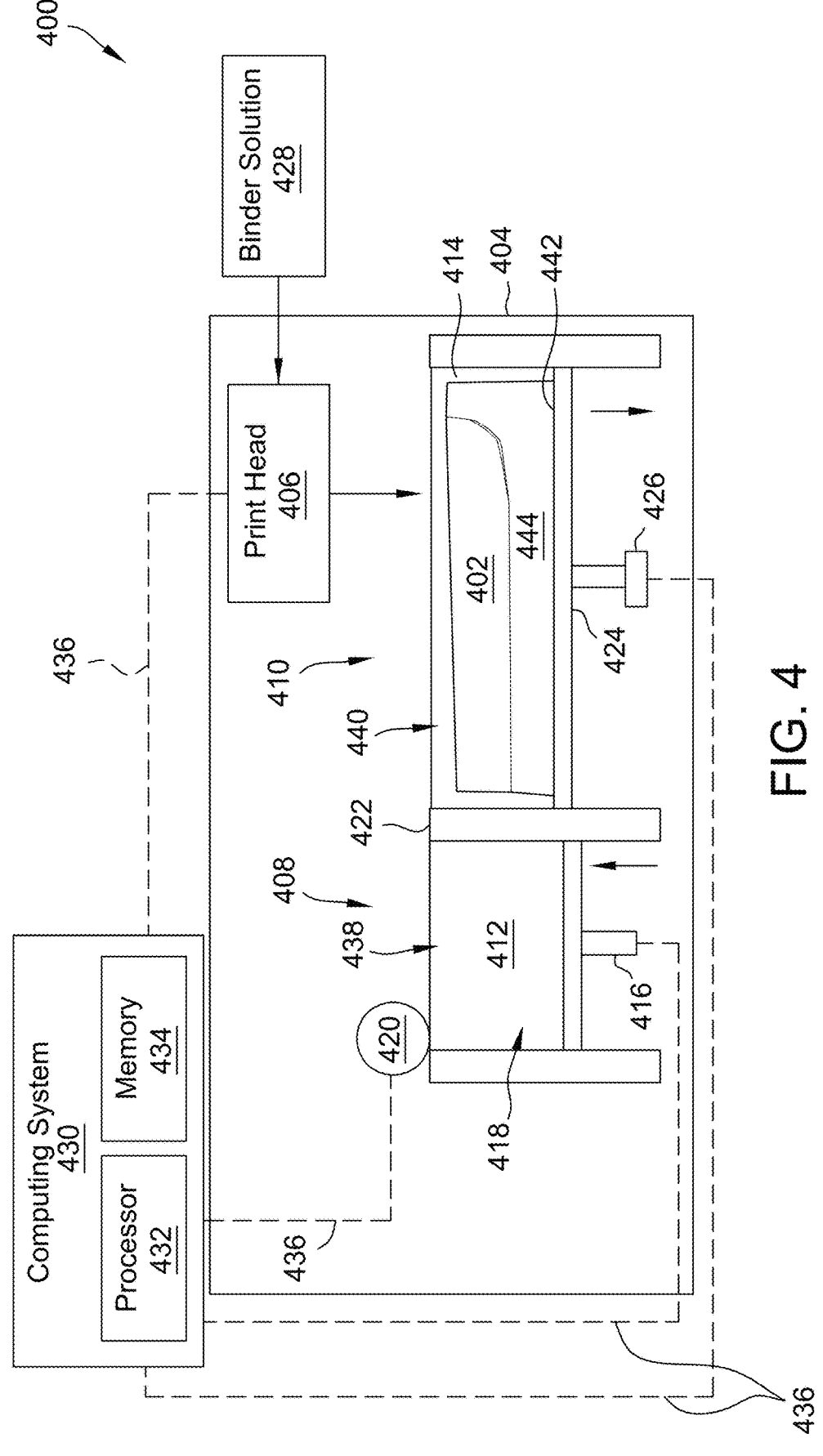
FIG. 4 is a schematic of an exemplary additive manufacturing system.

FIG. 4 is a schematic of an additive manufacturing system 400 that additively manufactures (or prints) a green body part 402 via binder jetting. The green body part 402 is subsequently sintered at a suitable temperature and for a suitable time duration to produce an erosion shield 326 having a relative sinter density. As will be described below, the resulting sinter density of the erosion shield 326 may be greater than or equal to 92%, to 95%, or even 98% of a theoretical maximum density. The erosion shield 326 produced by printing and sintering the green body part 402 as described herein is also characterized by an equiaxed grain structure, homogenous low porosity distribution, reduced residual stress, and other improved properties (e.g., increased fracture toughness, hardness, tensile strength, and erosion resistance) relative to erosions shields produced by other manufacturing techniques (e.g., casting or forging).

As shown, the additive manufacturing system 400 includes a housing 404, and a print head 406, a powder supply assembly 408, and a build chamber 410 within the housing 404. The powder supply assembly 408 includes a supply of powder 412. The powder 412 is particulate erosion-resistant material used to form the erosion shield 326. For example, the powder 412 is cobalt-chromium alloy particulate, such as STELLITE® 6 particulate. The powder supply assembly 408 also includes a powder piston 416 positioned within a powder supply chamber 418 containing the powder 412. The powder piston 416 may be raised within the powder supply chamber 418, thereby forcing a portion of the powder 412 out of the powder supply chamber 418 through a powder supply opening 438. A recoater 420, such as a roller or a blade/wiper, is operable to move across the powder supply opening 438 and push the powder 412 expelled from the powder supply chamber 418 across a work surface 422 and into the build chamber 410 through a build chamber opening 440.

The additive manufacturing system 400 also includes a build platform 424 positioned within the build chamber 410. The build platform 424 has a planar build surface 442 that supports the green body part 402 being printed and a powder bed 414 including excess powder 412 from the powder supply chamber 418 (i.e., powder 412 that is moved into the build chamber 410 and not used to print the green body part 402). The build platform 424 is moveable relative to the print head 406 along a build direction (i.e., the build platform 424 can be raised or lowered by a platform actuator 426 operatively coupled to the build platform 424) to enable a height of the green body part 402 to be varied during printing. During printing of the green body part 402, the recoater 420 spreads a layer of the powder 412 expelled from the powder supply chamber 418 across the build surface 442 of the build platform 424. Next, the print head 406 selectively deposits a binder solution 428 across the layer of the powder 412 that is representative of a layer of the green body part 402 being printed. The additive manufacturing system 400 may include any suitable number of print heads 406. For example, in the illustrated embodiment, the additive manufacturing system 400 includes a single print head 406. However, in alternative embodiments, the additive manufacturing system 400 may include two or more print heads 406. A plurality of layers of the powder 412 are successively applied across the build surface 442, and the print head 406 selectively deposits the binder solution 428 in a pattern across each of the layers of the powder 412. The build platform 424 is lowered before each application of the layer of the powder 412 and after the binder solution 428 is selectively deposited.

As shown in FIG. 4, a green body support structure 444 may also be printed on the build surface 442. The support structure 444 may be used to provide support for the green body part 402 during post-printing thermal processes (e.g., sintering) to mitigate distortion of certain structural features of the printed green body part 402, and to generally facilitate manufacture of complex geometries included within green body part 402. In the exemplary embodiment, the support structure 444 is printed along with the green body part 402, such that at least a portion of the support structure 444 is attached to or is formed integrally with the green body part 402. In other embodiments, the support structure 444 may be printed or manufactured separately from the green body part 402. The support structure 444 provides support to one or more regions of the green body part 402 that may undergo thermally induced distortion during post-printing thermal processing (e.g., sintering). In addition to supporting one or more regions of the printed green body part 402, the support structure 444 may undergo dimensional changes (e.g., volume changes) similar to dimensional changes experienced by the green body part 402 during post-printing thermal processing. The ability of the support structure 444 to undergo dimensional changes in a manner similar to the green body part 402 enables the support structure 444 to mitigate distortion of the green body part 402 by providing support to the desired regions throughout the transition from the green body part 402 to an intermediate consolidated part via de-binding and, finally, to the erosion shield 326 post-sintering. The support structure 444 may be removed after post-printing thermal processing (e.g., de-binding and sintering), for example, by machining, dissolution, etching, laser cutting, or any other suitable process that enables separation of the support structure 444.

In some embodiments, the printed support structure 244 has a different composition than that of the printed green body part 402. For example, the support structure 444 and the green body part 402 may be printed using different types of powder 412. For example, the support structure 444 may be printed using a powder 412 having different sintering properties than the powder 412 used to print the green body part 402. During sintering, a surface area-to-volume ratio between the support structure 444 and the green body part 402 (which, at this stage, may have undergone de-binding and may be referred to as a brown body part 402) changes, such that the support structure 444 pulls away from the printed brown body part 402 during sintering. For example, a sintering temperature for the support structure 444 may be higher than the sintering temperature for the brown body part 402. The difference in the sintering temperatures results in the brown body part 402 shrinking earlier than the support structure 444. The difference in a rate of densification between the support structure 444 and the brown body part 402 may result in breakage or separation of the support structure 444 from the part 402, thereby forming the consolidated, post-sintering erosion shield 326. In other embodiments, the powder 412 used to print the support structure 444 results in a strength of the support structure 444 post-sintering being less than that of the consolidated, post-sintering erosion shield 326. As such, the support structure 444 may be easier to cleave or break away from the erosion shield 326. In certain embodiments, the support structure 444 and the green body part 402 may be printed using different binder solutions 428. For example, the support structure 444 may be printed with a binder solution 428 that includes an anti-sintering agent. The anti-sintering agent may prevent at least a portion of the support structure 444 from consolidating during sintering such that the post-sintering support structure 444 can be easily removed from the erosion shield 326.

The additive manufacturing system 400 also includes a computing system 430 communicatively coupled to one or more components (e.g., the print head 406, the powder piston 416, the recoater 420, and/or the platform actuator 426) of the additive manufacturing system 400 to enable the computing system 400 to electronically or automatically control the operation of such components. In general, the computing system 430 may include one or more processor-based devices, such as a given controller or computing device or any suitable combination of controllers or computing devices. Thus, in several embodiments, the computing system 430 may include one or more processor(s) 432 and associated memory device(s) 434 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 434 of the computing system 430 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 434 may generally be configured to store suitable computer-readable instructions that, when implemented by the processor(s) 432, configure the computing system 430 to perform various computer-implemented functions, such as one or more aspects of the methods and algorithms that will be described herein. In addition, the computing system 430 may also include various other suitable components, such as a user interface, communications circuit or module, one or more input/output channels, a data/control bus and/or the like.

The various functions of the computing system 430 may be performed by a single processor-based device or may be distributed across any number of processor-based devices. In such instances, such processor-based devices may form part of the computing system 430. For instance, the functions of the computing system 430 may be distributed across multiple application-specific controllers, such an additive manufacturing device controller, a controller(s)/computing device(s) of a remote device(s) (e.g., a laptop, a desktop, a server, etc.), and/or the like.

In the exemplary embodiment, the computing system 430 is communicatively coupled to each of the powder piston 416, the recoater 420, and the platform actuator 426 via communicative links 436. The computing system 430 is configured to control the operation of the components of the additive manufacturing system 400 in printing the green body part 402. For example, the computing system 430 may control the powder piston 416 and the recoater 420 to cooperate in providing the powder 412 from the powder supply chamber 418 across the build surface 442, control the print head 406 to selectively deposit the binder solution 428 across a layer of powder 412 spread across the build surface 442, control the platform actuator 426 to lower the build platform 424 for a successive addition of powder 412 across the build surface 442, control the powder piston 416 to be raised for a successive layer of the powder 412 to be spread across the build surface 442 by the recoater 420, and so on.

As described above, the print head 406 selectively deposits the binder solution 428 across and into the layer of the powder 412 in a pattern that is representative of a layer of the green body part 402 (and, optionally, a layer of the support structure 444) being printed. In particular, the computing system 430 controls the print head 406 to selectively deposit the binder solution 428 such that the printed green body part 402 (and, optionally, the printed support structure 444) has a desired geometrical shape. The desired geometrical shape of the green body part 402 is such that, when the green body part 402 is sintered, the desired geometrical shape of the erosion shield 326 is obtained. The computing system 430, for example, may store CAD models of the green body part 402 and/or the erosion shield 326 in the memory device(s) 434 and controls the print head to print the green body part 402 using the CAD models. Additionally or alternatively, the computing system 430 may receive (e.g., from a user interface) input(s) of the desired geometrical shape of the green body part 402 and/or the erosion shield 326, for example, measurements of an erosion shield 326 previously produced (either using the additive machining system 400 or another manufacturing method). It should be understood that CAD models and/or input(s) of the geometry of the support structure 444 may also be received to facilitate the computing system 430 controlling the printing of the support structure 444.

After an entirety of an intended structure of the green body part 402 is formed using the additive manufacturing system 400, the plurality of layers of the powder 412 having the binder solution 428 deposited thereon and therein may be heated to a curing temperature (e.g., greater than or equal to about 25° C. and less than or equal to about 100° C.) to evaporate at least a portion of a solvent in the binder solution 428. Heat may be applied to the printed green body part 402 using an IR lamp and/or heated plate (e.g., on-machine), or may be carried out by placing the printed green body part 402 in an oven (e.g., off-machine). Upon curing, the binder bonds the particulate erosion-resistant material (e.g., cobalt-chromium alloy particulate, such as STELLITE® 6 particulate) according to the pattern of the binder solution 428 printed into each layer of powder 412 to form the green body part 402. Suitable binders include, but are not limited to, thermoplastic binders, thermoset binders, and non-polymeric binders such as waxes and sugars (e.g., glucose, fructose, derivatives thereof, or a combination thereof). It should be understood that the curing process may be performed with the green body part 402 attached to, integral with, or otherwise supported by the support structure 444, and that the particulate material forming the support structure 444 may undergo curing as well.

After formation and curing, the green body part 402 (which, at this stage, may be referred to as a brown body part 402) may be inserted into a sintering furnace (not depicted) for compaction of the brown body part 402 to produce the erosion shield 326. The brown body part 402 may include from about 50% to about 70% by volume of the particulate erosion-resistant material used to form the layers of powder 412. Another about 1% to about 2% of the volume of the brown body part 402 may include cured binder solution (e.g., cured from the binder solution 428). A remainder of the volume of the brown body part 402 may include porosity. As such, after production by the additive manufacturing system 400, the brown body part 402 may generally be approximately from about 50% dense to about 70% dense. It should be understood that such densities may be after performance of post-printing processes (e.g., transferring, inspection, depowdering, and the like) of the brown body part 402. It should also be understood that the sintering process may be performed with the brown body part 402 attached to, integral with, or otherwise supported by the support structure 444, and that the particulate material forming the support structure 444 may undergo compaction by sintering as well.

To sinter (or densify) the brown body part 402, the brown body part 402 (and the support structure 444) is transferred to a sintering furnace (not depicted) that heats the brown body part 402 (and the support structure 444) to at least a suitable elevated temperature and for a suitable time duration. During sintering, consolidation of the particulate erosion-resistant material (e.g., cobalt-chromium alloy particulate, such as STELLITE® 6 particulate) used to form the body part 402 compacts the particulate erosion-resistant material leading to volumetric shrinkage of the body part 402 in producing the erosion shield 326. As such, the post-sintering erosion shield 326 includes a volume that is scaled down from the body part 402 as a result of the compaction, while the geometric shape of the body part 402 and the erosion shield 326 is substantially the same. It should also be understood that the support structure 444 may be transformed into a post-sintering, consolidated part as well, experiencing volumetric shrinkage and volume scale-down as described above for the green body part 402.

In embodiments, sintering of the body part 402 (and the support structure 444) may occur in multiple stages. For example, in embodiments, sintering may include heating the body part 402 to at least a suitable first elevated temperature (for a suitable first time duration) to induce thermal decomposition of at least a portion of a binder used to print the body part 402 (e.g., to "de-bind" the body part 402). The body part 402 may then be heated above a second elevated temperature that is higher than the first elevated temperature to consolidate powder particles to form a post-sintering, consolidated part (e.g., the erosion shield 326). The second elevated temperature may be referred to as a sintering temperature at which the particulate erosion-resistant material (e.g., cobalt-chromium alloy particulate, such as STELLITE® 6 particulate) used to form the layers of powder 412 begins to consolidate the body part 402 and compact the green body part into a post-sintering erosion shield 326.

Suitably, the second elevated temperature is greater than or equal to about 1200° C. (e.g., greater than or equal to about 1250° C., greater than or equal to about 1260° C., greater than or equal to about 1280° C.). The time duration at which the body part 402 is heated at the sintering temperature may suitably be greater than or equal to 1 hours, greater than or equal to about 2 hours, greater than or equal to about 3 hours, greater than or equal to about 4 hours, such as for a time duration of between about 2 hours to about 4 hours. In embodiments, the body part 402 is sintered at a sintering temperature of between about 1260° C. to about 1300° C. for a time duration of between about 2 hours to about 4 hours to produce the erosion shield 326. In embodiments, the post-sintering erosion shield 326 possess a density that is greater than or equal to about 92% (e.g., greater than or equal to about 95%, or greater than or equal to about 98%). That is, the erosion shield 326 may have a porosity that is less than or equal to about 8% by volume, less than or equal to about 5% by volume, or less than or equal to about 2% by volume. Moreover, the post-sintering erosion shield 326 is characterized by an equiaxed grain structure, reduced residual stress, and other improved properties (e.g., increased fracture toughness, hardness, tensile strength, and erosion resistance) relative to erosions shields produced by other manufacturing techniques (e.g., casting or forging).

An exemplary method 500 of manufacturing (e.g., reconditioning) the turbine blade 300 that includes the erosion shield 326 will now be described with reference to FIG. 5. The method 500 includes providing 502 a turbine blade 300 for use with a rotary machine (e.g., the rotary machine 110 and/or the rotary machine 210). As described above, the turbine blade 300 includes an airfoil 302 that includes a leading edge 304 and an opposite trailing edge 306. The airfoil 302 includes a pressure side or sidewall 308 and a suction side or sidewall 310 each extending from the leading edge 304 to the trailing edge 306. The blade 300 also includes a root 312 that enables the blade 300 to be installed in a rotary machine, for example, the rotary machine 110 (shown in FIG. 1) and/or the rotary machine 210 (shown in FIG. 2), and the airfoil 302 and the root 312 are separated by a platform 314. The airfoil 302 extends between the platform 314 and a distal tip 316. The blade 300 may also include a tip shroud 336 fixedly coupled to, or integral with, the airfoil 302 at the distal tip 316. The tip shroud 336 may generally define the radially outermost portion of the blade 300 and the tip shroud 336 provides a surface area that runs substantially perpendicular to the airfoil 302 such that it caps or covers the tip 316 of the airfoil 302. The tip shroud 336 extends between a first end 338 proximate to the leading edge 304 and an opposite second end 340 proximate to the trailing edge 306.

In some implementations of the exemplary method 500, the turbine blade 300 that is provided 502 has been used during operation and the method 500 is performed to recondition the turbine blade 300. For example, the turbine blade 300 that is provided 502 may include a region of the leading edge 304 proximate to the tip 316 that has been damaged or deteriorated by the mechanical and/or thermal stresses induced during turbine operation. The method 500 may include removing 504 the damaged region of the leading edge 304 to form a recessed area 318 (shown in FIG. 3) in the leading edge 304 proximate to the tip 316. Removing 504 the damaged region to form the recessed area 318 may be performed, for example, by machining, dissolution, etching, laser cutting, or any other suitable process that enables removing 504 the damaged region of the leading edge 304. Forming the recessed area 318 from a damaged region of the turbine blade 300 that is provided enables existing, damaged turbine blades 300 to be retrofitted with the erosion shields 326 described herein.

As another example, the turbine blade 300 that is provided 502 may include an erosion shield 326 coupled to the leading edge 304 and, during operation, the erosion shield 326 may be damaged or deteriorated by the mechanical and/or thermal stresses induced during turbine operation. The method 500 may include removing 504 the erosion shield 326 (shown in FIG. 3) from the leading edge 304. The erosion shield 326 that is removed 504 from the turbine blade 300 may be referred to herein as a first erosion shield 326. Removing 504 the first erosion shield 326 may be performed, for example, by machining, dissolution, etching, laser cutting, or any other suitable process that enables removing 504 the first erosion shield 326 from the leading edge 304.

The method 500 also includes printing 506 a green body part 402 by an additive manufacturing process. Specifically, the additive manufacturing process is a binder jetting process. Binder jet additive manufacturing to print 506 the green body part 402 may be performed using the additive manufacturing system 400 or any other suitable binder jet additive manufacturing system. As described above, the green body part 402 is printed 506 on a build surface 442. A recoater 420 spreads a layer of powder 412 across the build surface 442, the powder 412 having been expelled from a powder supply chamber 418, and a print head 406 selectively deposits a binder solution 428 across the layer of powder 412. The powder 412 is suitably particulate erosion-resistant material (e.g., cobalt-chromium alloy particulate, such as STELLITE® 6 particulate). The process repeats as successive layers of the powder 412 are spread across the build surface 442 and binder solution 428 is selectively deposited across the each layer of the powder 412. For each layer of the powder 412, the binder solution 428 is selectively deposited in a pattern that is representative of a layer of the green body part 402 being printed 506. As described above, the binder jetting process for printing 506 the green body part 402 may be controlled by a computing system 430. The computing system 430 controls the geometry of the printed green body part 402 according to CAD models or input measurements of the green body part 402 and/or a post-sintering erosion shield 326 produced by subsequent thermal processing of the green body part 402. A green body support structure 444 for supporting the green body part 402 during subsequent thermal processing (e.g., sintering) may be printed while printing 506 the green body part 402, or the support structure 444 may be printed separately.

After printing 506 the green body part 402, the method 500 includes sintering 508 the green body part 402 to produce a post-sintering erosion shield 326. As described above, the sintering 508 is performed at a suitable temperature and for a suitable time duration to facilitate densifying the particulate erosion-resistant material of the green body part 402 such that the post-sintering erosion shield 326 includes compacted, densified erosion-resistant material (e.g., densified cobalt-chromium alloy material, such as densified STELLITE® 6 material). The sintering 508 is suitably performed at a temperature and for a time duration sufficient to facilitate producing the densified erosion-resistant material forming the post-sintering erosion shield 326 with desired properties. For example, the sintering 508 may be performed at a temperature and for a time duration sufficient to facilitate producing the densified erosion-resistant material having an equiaxed grain structure. Additionally or alternatively, the sintering 508 may be performed at a temperature and for a time duration sufficient to facilitate producing the densified erosion-resistant material having a relative density (i.e., relative to a theoretical maximum of the densified erosion-resistant material) greater than or equal to 92%, such as greater than or equal to 95%, or even greater than or equal to 98%. Additionally or alternatively, the sintering 508 may be performed at a temperature and for a time duration sufficient to facilitate producing the densified erosion-resistant material having a porosity (with a substantially homogenous distribution) of less than or equal to 8% by volume, less than or equal to 5% by volume, or even less than or equal to 2% by volume. Suitably, the sintering 508 is performed at a temperature greater than or equal to about 1200° C., such as greater than or equal to about 1250° C., greater than or equal to about 1260° C., or greater than or equal to about 1280° C. Suitably, the sintering 508 is performed for a time duration greater than or equal to about 1 hours, greater than or equal to about 2 hours, greater than or equal to about 3 hours, or greater than or equal to about 4 hours. In some embodiments, the sintering 508 is performed at a temperature greater than or equal to about 1260° C. and for a time duration of greater than or equal to about 2 hours. In embodiments, the sintering 508 is performed at a temperature between about 1260° C. to about 1300° C. for a time duration of between about 2 hours to about 4 hours to produce the erosion shield 326. In addition to the equiaxed grain structure, the high relative density and homogenous low porosity distribution of the densified erosion-resistant material, the post-sintering erosion shield 326 is characterized having other improved properties (e.g., increased fracture toughness, hardness, tensile strength, and erosion resistance) relative to erosions shields produced by other manufacturing techniques (e.g., casting or forging).

Figure 6:
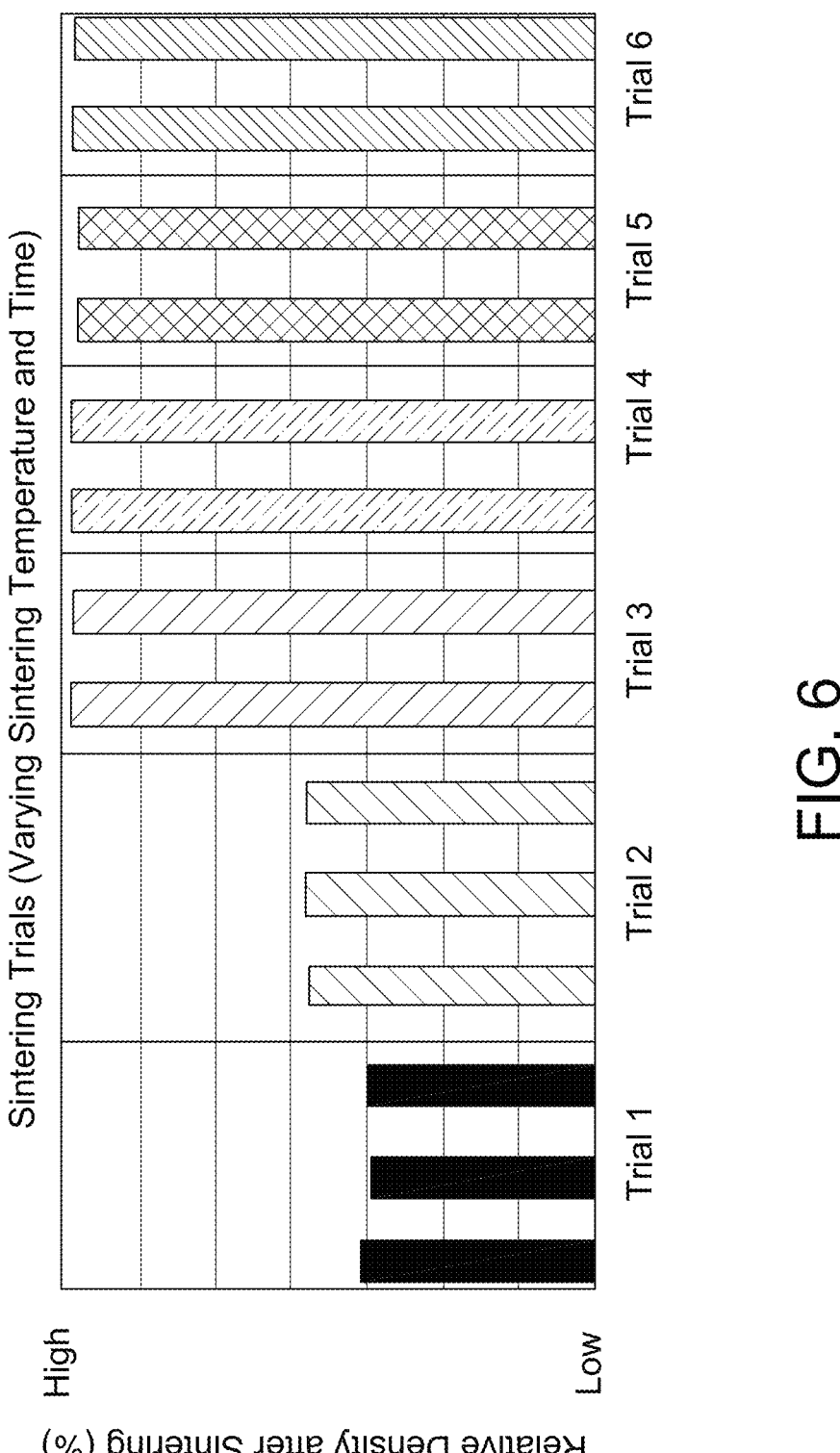
FIG. 6 is a graph showing relative density percentages of an erosion-resistant material post-sintering at varying sintering temperatures and time durations.
Figures 7A, 7B, 7C, 8A, 8B, 8C:
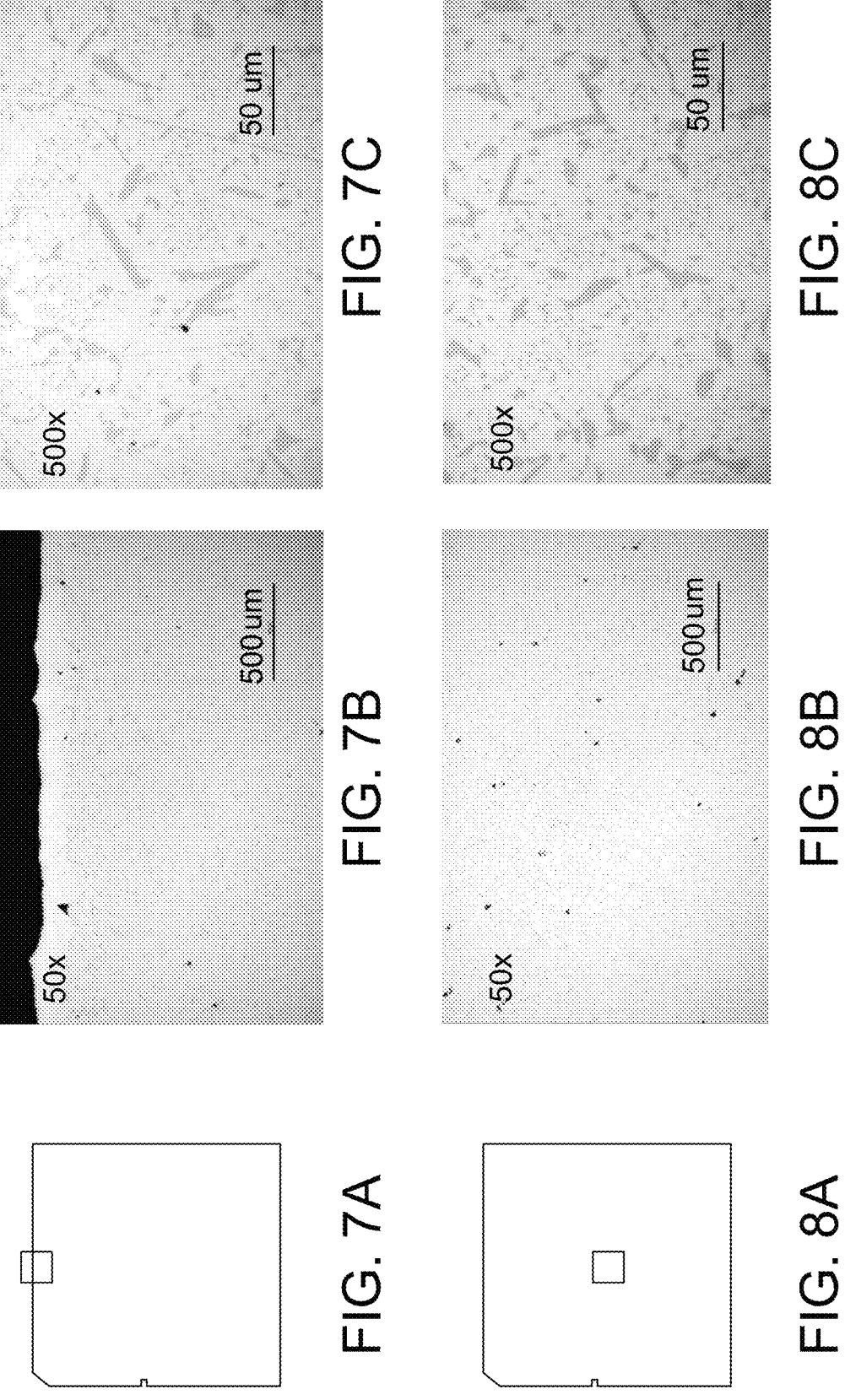
FIGS. 7A-7C and 8A-8C show optical microscopy images of post-sintering, erosion-resistant material coupons.

The conditions during sintering 508 are optimized to achieve higher sinter density and desirable porosity distribution and uniformity. To demonstrate, reference is made to FIG. 6, which shows relative density of densified STELLITE® 6 material, an example erosion-resistant used to produce the erosion shield 326, achieved at various sintering conditions. Higher relative densities of the densified STELLITE® 6 material were achieved at sintering temperatures greater than about 1260° C. and time durations of between about 2 hours to about 4 hours. Specifically, under the optimal sintering conditions (trials 3-6), relative densities of greater than 98% were achieved. Referring to FIGS. 7A-7C and 8A-8C, optical microscopy of sintered STELLITE® 6 material coupons reveals that the sintering conditions also produce homogenous low porosity distribution in the sintered erosion-resistant material. Specifically, FIGS. 7A-7C show optical microscopy images at 50× (FIG. 7B) and 500× (FIG. 7C) scale of a top edge of a sintered STELLITE® 6 material coupon (FIG. 7A) and FIGS. 8A-8C show optical microscopy images at 50× (FIG. 8B) and 500× (FIG. 8C) scale of a center of a sintered STELLITE® 6 material coupon (FIG. 8A). The optical microscopy images confirm that the sintered coupons had homogenous low porosity distribution.

Referring again to FIG. 5, the method 500 also includes, after printing 506 and sintering 508, coupling 510 the post-sintering erosion shield 326 to the leading edge 304 of the turbine blade 300. In embodiments where the method 500 includes removing 504 a damaged region of the leading edge 304, coupling 510 the post-sintering erosion shield 326 is performed after removing 504 the damaged region. For example, coupling 510 the post-sintering erosion shield 326 may be performed after removing 504 a first, damaged erosion shield 326. Additionally or alternatively, coupling 510 the post-sintering erosion shield 326 may be performed after removing 504 the damaged region to form the recessed area 318 in the leading edge 304, and coupling 510 the post-sintering erosion shield 326 includes coupling the post-sintered erosion shield 326 to extend across the recessed area 318. Coupling 510 the post-sintering erosion shield 326 to the leading edge 304 may include welding, such as, for example, via laser welding, gas metal arc welding (or metal inert gas welding), electron beam welding, or gas tungsten arc welding. A filler material, such as nickel-based materials and iron-based materials, for example, may be used to couple 510 (e.g., weld) the erosion shield 326 to the leading edge 304. In some embodiments, a post-weld heat treatment may be performed on the weld region of the erosion shield 326 and/or the airfoil 302 to enable the heat affect zone(s) to achieve required material properties. Excess material on the weld seam between the erosion shield 326 and the leading edge 304 may be machined off (e.g., by grinding) to achieve targeted tolerances for the erosion-shield turbine blade 300.

In some embodiments, coupling 510 the post-sintering erosion shield 326 may include coupling 510 the post-sintering erosion shield 326 to the leading edge 304 and to the first end 338 of the tip shroud 336 proximate to the leading edge 304. Conventionally, a separate wear-resistant component is coupled to the first end 338 of the tip shroud 336. In the embodiments described herein, the binder jet additive manufacturing techniques used to print 506 the green body part 402 may facilitate consolidating the erosion shield 326 and the separate wear resistant-component into a single geometry (i.e., a single erosion shield 326) that spreads across a desired portion of the leading edge 304 and substantially across the first end 338 of the tip shroud 336. Alternatively stated, the erosion shield 326 spreads across the portions of the leading edge 304 and the tip shroud 336 (which may be the entirety of the first end 338 of the tip shroud 336 or substantially the entirety thereof) such that no additional wear components are needed for these regions of the turbine blade 300. Consolidating these wear components into a single geometry (i.e., into the erosion shield 326) may facilitate reducing manufacturing time and costs, reducing welding time and complexities, and provide other advantages as well.

Embodiments of erosion-shielded rotary components, and methods of manufacturing such erosion-shielded rotary components, overcome at least some disadvantages of known rotary components and provide several advantages over conventional designs and processes. Erosion shields according to the present embodiments are additively manufactured using a binder jet additive manufacturing technique that facilitates reducing the lead time of erosion shields when manufacturing and reconditioning erosion-shielded turbine blades (e.g., during a maintenance, repair and overhaul event). Multiple binder jet additive manufacturing systems, or binder jet additive manufacturing systems having multiple print heads, may be utilized, to facilitate further increasing throughput of the erosion shields during an MRO event. Binder jet additive manufacturing techniques also facilitate the additional advantage of producing erosion shields including densified erosion-resistant material that has desired material properties. For example, the post-sintering erosion shields produced by printing and subsequently sintering a green body part having the requisite geometry are characterized having an equiaxed grain structure and little to no residual stress, which facilitates reducing or eliminating the potential for the erosion-resistant material to form stress-induced cracks. The material characterization of erosion shields produced according to the above-described embodiments advantageously differentiates such erosion shields over erosion shields produced by conventional techniques, such as forging or casting, and even other additive manufacturing processes (e.g., laser powder bed fusing, electron beam melting, and directed energy deposition processes).

Exemplary embodiments of an erosion-shielded rotary component, methods of forming an erosion shield for attaching to a rotary component, and methods of forming an erosion-shielded rotary component, are described above in detail. The erosion-shielded rotary components and erosion shields are not limited to the specific embodiments described herein, but rather, components of systems may be utilized independently and separately from other components described herein. For example, the erosion shields formed as disclosed herein may be used in combination with rotary components other than those specifically described herein, and the erosion-shielded rotary components may also be used in combination with other rotary machines and methods, and are not limited to practice with only the gas turbine engine or steam turbine engine assemblies as described herein. Rather, the exemplary embodiment can be implemented and utilized in connection with many other rotary machine applications.

Further aspects of the present disclosure are provided by the subject matter of the following clauses:

1. A method of manufacturing an erosion-shielded turbine blade, the method comprising providing a turbine blade for use with a rotary machine, the turbine blade including an airfoil extending between a root and a tip, the airfoil including a pressure side and an opposite suction side, each of the pressure and suction sides extending between a leading edge and a trailing edge; printing a green body part by an additive manufacturing process by selectively depositing a binder solution across a particulate erosion-resistant material; sintering the green body part to produce a post-sintering erosion shield that includes densified erosion-resistant material; and coupling the erosion shield to the leading edge of the turbine blade.

2. The method in accordance with the preceding clause, wherein sintering the green body part further comprises sintering the green body part at a suitable temperature and for a suitable time duration to facilitate producing the post-sintering erosion shield including the densified erosion-resistant material with an equiaxed grain structure.

3. The method in accordance with any preceding clause, wherein sintering the green body part further comprises sintering the green body part at a suitable temperature and for a suitable time duration to facilitate producing the post-sintering erosion shield including the densified erosion-resistant material with a relative density greater than or equal to about 92%.

4. The method in accordance with any preceding clause, wherein sintering the green body part further comprises sintering the green body part at a suitable temperature and for a suitable time duration to facilitate producing the post-sintering erosion shield including the densified erosion-resistant material with a porosity of less than or equal to about 8% by volume.

5. The method in accordance with any preceding clause, further comprising sintering the green body part at a temperature greater than or equal to about 1260° C. and for a time duration of greater than or equal to about 2 hours.

6. The method in accordance with any preceding clause, wherein printing the green body part further comprises selectively depositing a binder solution across a particulate cobalt-chromium alloy material.

7. The method in accordance with any preceding clause, further comprising printing a green body support structure that supports the green body part during the sintering and, after sintering the green body part and the green body support structure, removing the post-sintering support structure from the post-sintering erosion shield.

8. The method in accordance with any preceding clause, wherein the turbine blade includes a tip shroud fixedly coupled to the tip of the airfoil, and wherein coupling the erosion shield to the leading edge of the turbine blade further comprises coupling the erosion shield to extend substantially across an end of the tip shroud proximate to the leading edge.

9. A method of reconditioning an erosion-shielded turbine blade, the method comprising providing a turbine blade for use with a rotary machine, the turbine blade including an airfoil extending between a root and a tip, the airfoil including a pressure side and an opposite suction side, each of the pressure and suction sides extending between a leading edge and a trailing edge, and a damaged region along the leading edge; removing the damaged region from the leading edge; printing a green body part by an additive manufacturing process by selectively depositing a binder solution across a particulate erosion-resistant material; sintering the green body part to produce a post-sintering erosion shield that includes densified erosion-resistant material; and coupling the post-sintering erosion shield to the leading edge of the turbine blade after removing the damaged region.

10. The method in accordance with any preceding clause, wherein the damaged region along the leading edge is a first erosion shield coupled to the leading edge, and removing the damaged region comprises removing the first erosion shield from the leading edge.

11. The method in accordance with any preceding clause, wherein removing the damaged region comprises forming a recessed area in the leading edge proximate to the tip, and wherein coupling the post-sintering erosion shield to the leading edge comprises coupling the post-sintering erosion shield to extend across the recessed area.

12. The method in accordance with any preceding clause, wherein sintering the green body part further comprises sintering the green body part at a suitable temperature and for a suitable time duration to facilitate producing the post-sintering erosion shield including the densified erosion-resistant material with an equiaxed grain structure and a relative density greater than or equal to 92%.

13. The method in accordance with any preceding clause, further comprising sintering the green body part at a temperature greater than or equal to about 1260° C. and for a time duration of greater than or equal to about 2 hours.

14. The method in accordance with any preceding clause, wherein printing the green body part further comprises selectively depositing a binder solution across a particulate cobalt-chromium alloy material.

15. The method in accordance with any preceding clause, further comprising printing a green body support structure that supports the green body part during the sintering and, after sintering the green body part and the green body support structure, removing the post-sintering support structure from the post-sintering erosion shield.

16. The method in accordance with any preceding clause, wherein the turbine blade includes a tip shroud fixedly coupled to the tip of the airfoil, and wherein coupling the post-sintering erosion shield to the leading edge of the turbine blade further comprises coupling the post-sintering erosion shield to extend substantially across an end of the tip shroud proximate to the leading edge.

17. A method of manufacturing an erosion-shielded turbine blade, the method comprising providing a turbine blade for use with a rotary machine, the turbine blade including an airfoil extending between a root and a tip, the airfoil including a pressure side and an opposite suction side, each of the pressure and suction sides extending between a leading edge and a trailing edge, and a tip shroud fixedly coupled to the tip; printing a green body part by an additive manufacturing process by selectively depositing a binder solution across a particulate erosion-resistant material; sintering the green body part to produce a post-sintering erosion shield that includes densified erosion-resistant material; and coupling the erosion shield to the leading edge of the turbine blade and to an end of the tip shroud proximate to the leading edge such that the erosion shield extends substantially across the end of the tip shroud.

18. The method in accordance with any preceding clause, wherein sintering the green body part further comprises sintering the green body part at a suitable temperature and for a suitable time duration to facilitate producing the post-sintering erosion shield including the densified erosion-resistant material with an equiaxed grain structure and a relative density greater than or equal to 92%.

19. The method in accordance with any preceding clause, further comprising sintering the green body part at a temperature greater than or equal to about 1260° C. and for a time duration of greater than or equal to about 2 hours.

20. The method in accordance with any preceding clause, wherein printing the green body part further comprises selectively depositing a binder solution across a particulate cobalt-chromium alloy material.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of manufacturing an erosion-shielded turbine blade, the method comprising:

providing a turbine blade for use with a rotary machine, the turbine blade including an airfoil extending between a root and a tip, the airfoil including:

a pressure side and an opposite suction side, each of the pressure and suction sides extending between a leading edge and a trailing edge, and a recessed area formed in the leading edge proximate the tip, the recessed area having a radial length that is shorter than a radial length of the airfoil measured between the root and the tip of the airfoil;

printing a green body part by an additive manufacturing process by selectively depositing a binder solution across a particulate erosion-resistant material;

sintering the green body part to produce a post-sintering erosion shield that includes densified erosion-resistant material, wherein sintering the green body part is performed at a suitable temperature and for a suitable time duration to facilitate producing the post-sintering erosion shield including the densified erosion-resistant material with an equiaxed grain structure and a relative density greater than or equal to about 92%; and coupling the erosion shield within the recessed area formed in the leading edge of the turbine blade, the erosion shield including an outer surface that is flush with a remaining portion of the leading edge for the airfoil formed adjacent the recessed area, wherein the erosion shield forms a continuous and smooth transition for the airfoil between the outer surface and the remaining portion of the leading edge.

2. The method in accordance with claim 1, wherein sintering the green body part further comprises sintering the green body part at a suitable temperature and for a suitable time duration to facilitate producing the post-sintering erosion shield including the densified erosion-resistant material with a relative density greater than or equal to about 95%.

3. The method in accordance with claim 1, wherein sintering the green body part further comprises sintering the green body part at a suitable temperature and for a suitable time duration to facilitate producing the post-sintering erosion shield including the densified erosion-resistant material with a porosity of less than or equal to about 5% by volume.

4. The method in accordance with claim 1, further comprising sintering the green body part at a temperature greater than or equal to about 1260° C. and for a time duration of greater than or equal to about 2 hours.

5. The method in accordance with claim 1, wherein printing the green body part further comprises selectively depositing a binder solution across a particulate cobalt-chromium alloy material.

6. The method in accordance with claim 1, further comprising printing a green body support structure that supports the green body part during the sintering and, after sintering the green body part and the green body support structure, removing the post-sintering support structure from the post-sintering erosion shield.

7. The method in accordance with claim 1, wherein the turbine blade includes a tip shroud fixedly coupled to the tip of the airfoil, and wherein coupling the erosion shield to the leading edge of the turbine blade further comprises coupling the erosion shield to extend substantially across an end of the tip shroud proximate to the leading edge.

8. The method in accordance with claim 1, wherein coupling the erosion shield within the recessed area further comprises directly coupling an inner surface of the erosion shield to a recessed surface of the recessed area, the inner surface of the erosion shield formed opposite the outer surface and shaped to match a three-dimensional geometry of the recessed surface of the recessed area.

9. A method of reconditioning an erosion-shielded turbine blade, the method comprising:

providing a turbine blade for use with a rotary machine, the turbine blade including an airfoil extending between a root and a tip, the airfoil including a pressure side and an opposite suction side, each of the pressure and suction sides extending between a leading edge and a trailing edge, and a damaged region along the leading edge;

removing the damaged region from the leading edge to:

form a recessed area in the leading edge proximate the tip, the recessed area having radial length that is shorter than a radial length of the airfoil, and define a remaining portion of the leading edge positioned radially adjacent the recessed area;

printing a green body part by an additive manufacturing process by selectively depositing a binder solution across a particulate erosion-resistant material;

sintering the green body part to produce a post-sintering erosion shield that includes densified erosion-resistant material, wherein sintering the green body part is performed at a suitable temperature and for a suitable time duration to facilitate producing the post-sintering erosion shield including the densified erosion-resistant material with an equiaxed grain structure and a relative density greater than or equal to about 92%; and coupling the post-sintering erosion shield within the recessed area formed in the leading edge of the turbine blade after removing the damaged region, the post-sintering erosion shield including an outer surface that is flush with the defined, remaining portion of the leading edge for the airfoil formed radially adjacent the recessed area, wherein the post-sintering erosion shield forms a continuous and smooth transition for the airfoil between the outer surface and the remaining portion of the leading edge.

10. The method in accordance with claim 9, wherein the damaged region along the leading edge is a first erosion shield coupled to the leading edge, and removing the damaged region comprises removing the first erosion shield from the leading edge.

11. The method in accordance with claim 9, wherein sintering the green body part further comprises sintering the green body part at a suitable temperature and for a suitable time duration to facilitate producing the post-sintering erosion shield including the densified erosion-resistant material with the equiaxed grain structure and a relative density greater than or equal to 95%.

12. The method in accordance with claim 9, further comprising sintering the green body part at a temperature greater than or equal to about 1260° C. and for a time duration of greater than or equal to about 2 hours.

13. The method in accordance with claim 9, wherein printing the green body part further comprises selectively depositing a binder solution across a particulate cobalt-chromium alloy material.

14. The method in accordance with claim 9, further comprising printing a green body support structure that supports the green body part during the sintering and, after sintering the green body part and the green body support structure, removing the post-sintering support structure from the post-sintering erosion shield.

15. The method in accordance with claim 9, wherein the turbine blade includes a tip shroud fixedly coupled to the tip of the airfoil, and wherein coupling the post-sintering erosion shield to the leading edge of the turbine blade further comprises coupling the post-sintering erosion shield to extend substantially across an end of the tip shroud proximate to the leading edge.

16. The method in accordance with claim 9, wherein coupling the post-sintering erosion shield within the recessed area formed in the leading edge of the turbine blade further comprises directly coupling an inner surface of the post-sintering erosion shield to a recessed surface of the recessed area, the inner surface of the post-sintering erosion shield formed opposite the outer surface and shaped to match a three-dimensional geometry of the recessed surface of the recessed area.

17. A method of manufacturing an erosion-shielded turbine blade, the method comprising:

providing a turbine blade for use with a rotary machine, the turbine blade including an airfoil extending between a root and a tip, the airfoil including:

a pressure side and an opposite suction side, each of the pressure and suction sides extending between a leading edge and a trailing edge, a recessed area formed in the leading edge proximate the tip, the recessed area having a radial length that is shorter than a radial length of the airfoil, and a tip shroud fixedly coupled to the tip;

printing a green body part by an additive manufacturing process by selectively depositing a binder solution across a particulate erosion-resistant material;

sintering the green body part to produce a post-sintering erosion shield that includes densified erosion-resistant material, wherein sintering the green body part is performed at a suitable temperature and for a suitable time duration to facilitate producing the post-sintering erosion shield including the densified erosion-resistant material with an equiaxed grain structure and a relative density greater than or equal to about 92%; and coupling the erosion shield within the recessed area formed in the leading edge of the turbine blade and to an end of the tip shroud proximate to the leading edge such that the erosion shield extends substantially across the end of the tip shroud, wherein the erosion shield includes an outer surface that is flush with a remaining portion of the leading edge for the airfoil formed adjacent the recessed area, and the erosion shield forms a continuous and smooth transition for the airfoil between the outer surface and the remaining portion of the leading edge.

18. The method in accordance with claim 17, wherein sintering the green body part further comprises sintering the green body part at a suitable temperature and for a suitable time duration to facilitate producing the post-sintering erosion shield including the densified erosion-resistant material with an equiaxed grain structure and a relative density greater than or equal to 95%.

19. The method in accordance with claim 17, further comprising sintering the green body part at a temperature greater than or equal to about 1260° C. and for a time duration of greater than or equal to about 2 hours.

20. The method in accordance with claim 17, wherein printing the green body part further comprises selectively depositing a binder solution across a particulate cobalt-chromium alloy material.

* * * * *